Feb. 1, 1938.  H. H. HAIRE  2,106,737
FLEXIBLE CONNECTER
Filed Dec. 5, 1936
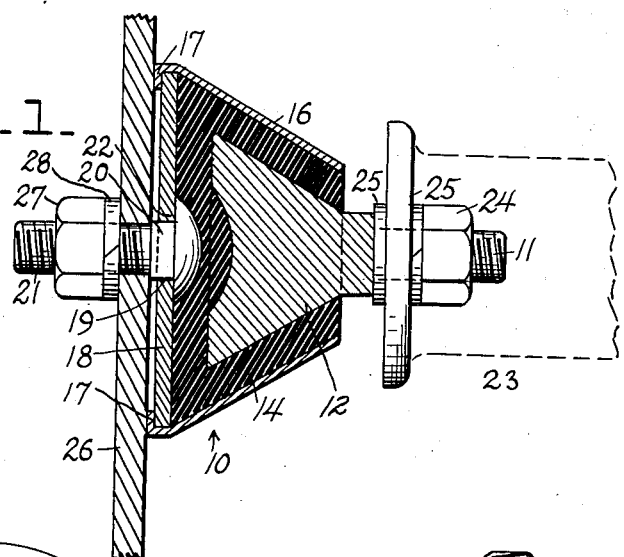
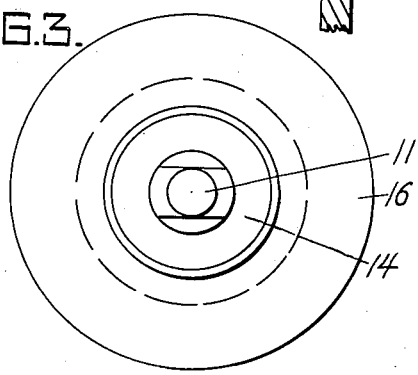
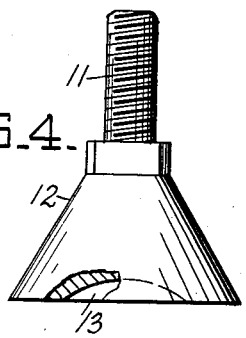
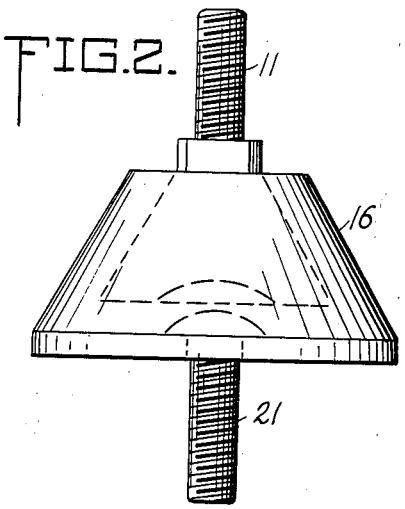
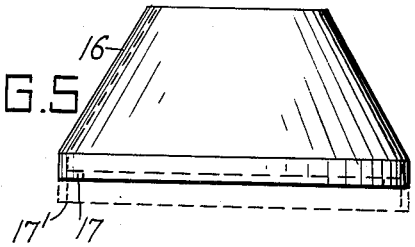
INVENTOR
BY HOMER H. HAIRE.
ATTORNEY Patented Feb. 1, 1938

2,106,737

UNITED STATES PATENT OFFICE 2,106,737

FLEXIBLE CONNECTER

Homer H. Haire, Washington, D. C.

Application December 5, 1936, Serial No. 114,340

2 Claims. (Cl. 287—85)

(Granted under the act of March 3, 1883, as amended April 30, 1928; 370 O. G. 757)

This invention relates to flexible connecters of the type shown generally in U. S. Patents Nos. 1,828,402, 1,871,963, 1,872,259, 2,026,625, and has for an object to provide an improved flexible connecter especially adapted for use as a vibration dampener, primarily for the purpose of mounting propeller type fans on bulkhead or vertical surfaces such as the interior of vertical ventilating ducts. It can be further used, however, for suspending fans of any type from a ceiling or deck overhead.

To be entirely suitable for bulkhead mounting of propeller fans, vibration dampeners must necessarily be small in size, compact in design, and safe from failure in the event that the resilient cushion should give way. Further, no metallic contact should exist between the fan and the bulkhead. While the metallic parts of this flexible connecter may be vulcanized or bonded to the rubber therebetween, the design of this invention is such that the bonding or vulcanizing is unnecessary, the rubber element being so enclosed within the metallic parts that in the absence or failure of the rubber element there can be no conceivable separation of the metallic parts.

With the foregoing and other objects in view, the invention consists in the construction, combination and arrangement of parts, as will be described more fully hereafter.

In the drawing:

Fig. 1 is a sectional view of the flexible connecter in operative position;

Fig. 2 is a side elevational view;

Fig. 3 is a top view of Fig. 2;

Fig. 4 is an elevational view partly broken away of the bolt having a conical head, and Fig. 5 is an elevational view of the conical cup adapted to fit over the conical head of Fig. 4.

The flexible connecter 10 of this invention comprises a threaded bolt 11 having a conical head 12 extending therefrom, the conical head 12 being formed with a concave recess 13 in the base thereof. A rubber cushioning cup 14 correspondingly shaped is adapted to be fitted about the conical head 12 and held in position thereon by its natural resiliency. A conical metallic cup 16 is then placed over the assembled conical bolt head 12 and cushioning cup 14 and is provided with a cylindrical flange which is turned inwardly from the position 17' to the position 17 to hold therein a large washer 18. This washer 18 is provided with a squared recess 19 to receive the square shoulder 20 of a threaded bolt 21 therethrough, a rounded head 22 on the bolt 21 tending to force the base of the cushioning cup 14 into the concave recess 13, as shown in Fig. 1.

In operation, the flexible connecter may be utilized for supporting a load, such as a fan base or the like 23, by having the bolt 11 extend therein and be secured thereto by nut 24 and suitable washers 25. The bolt 21 may project through a vertical wall or bulkhead 26 and be secured by nut 27 and a suitable washer 28. As will be observed, the maximum diameter of the base of conical head 12 is substantially greater than the maximum opening at the apex of the conical cup 16, and it is therefore impossible in the event of failure of the cushioning cup 14 for the conical head 12 to separate from the cup 16, even though the cushioning cup 14 may deteriorate or rust with age.

As insurance against failure of the flange 17, it will be observed that the mounting of the flexible connecter 10 on the bulkhead 26 is such that the flange 17 is held firmly between the washer 18 and the bulkhead 26, thus reinforcing the flange 17.

Other modifications and changes in the proportions and arrangements of the parts may be made by those skilled in the art without departing from the nature and scope of the invention, as defined in the appended claims.

The invention described herein may be manufactured and used by or for the Government of the United States of America for governmental purposes without the payment of any royalties thereon or therefor.

Having thus set forth and disclosed the nature of this invention, what is claimed is:

1. A connecter for yieldably connecting two members, comprising a cone shaped resilient cushioning cup having an open apex and a closed base, a bolt having a correspondingly shaped cone head inserted within said cushioning cup, a metallic conical cup placed about the side of said cushioning cup, a washer member covering said cushioning cup base, a securing member extending through said washer member, and a flange extending from said metallic cup about the edges of said washer member to hold the connecter in assembled position.

2. A connecter for yieldably connecting two members, comprising a cone shaped resilient cushioning cup having an open apex and a closed base, a bolt having a correspondingly shaped cone head inserted within said cushioning cup, a metallic conical cup placed about the side of said cushioning cup, a washer member covering said cushioning cup base, a securing member extending through said washer member, a flange extending from said metallic cup about the edges of said washer member to hold the connecter in assembled position, said cone shaped head of said bolt having a concave recess formed therein, said securing member comprising a threaded bolt, a a squared shoulder, said washer having a square aperture with which said squared shoulder cooperates, and a convex bolt head on said bolt corresponding in shape to the concave aperture in said conical cup of said first mentioned bolt, said convex head pressing part of the cushioning cup base into said concave aperture.

HOMER H. HAIRE.